United States Patent [19]

Venolia

[11] Patent Number: 5,050,961

[45] Date of Patent: Sep. 24, 1991

[54] POLARIZED MASK STEREOSCOPIC DISPLAY INCLUDING TILING MASKS WITH COMPLEMENTARY TRANSPARENT REGIONS

[75] Inventor: Daniel S. Venolia, Soquel, Calif.

[73] Assignee: Apple Computer, Inc., Cupertino, Calif.

[21] Appl. No.: 551,689

[22] Filed: Jul. 12, 1990

Related U.S. Application Data

[63] Continuation-in-part of Ser. No. 402,945, Sep. 5, 1989, abandoned.

[51] Int. Cl.$^5$ .............................................. G02B 27/26
[52] U.S. Cl. ................................... 359/465; 359/900
[58] Field of Search .................... 350/132, 320; 358/91

[56] References Cited

U.S. PATENT DOCUMENTS

| 2,218,875 | 10/1940 | Parsell | 350/132 |
| 2,623,433 | 12/1952 | Stipek | 350/132 |
| 2,883,906 | 4/1959 | Rehorn | 350/132 |
| 4,134,644 | 1/1979 | Marks et al. | 350/132 |

FOREIGN PATENT DOCUMENTS

| 3205483 | 8/1983 | Fed. Rep. of Germany | 350/132 |
| 3214327 | 10/1983 | Fed. Rep. of Germany | 350/132 |
| 184929 | 10/1983 | Japan | 350/132 |

OTHER PUBLICATIONS

"The Inventor's Sketchpad" by Roger C. Garrett, Interface Age, Apr. 1982, pp. 24–33.

Primary Examiner—Jon W. Henry
Attorney, Agent, or Firm—Mark Aaker

[57] ABSTRACT

A full-spectrum stereoscopic display system with a tiled display image of alternating tiles from first and second full-spectrum images of a stereo pair of images is covered by an identically tiled polarized mask, with alternating tiles of said polarized mask being cross polarized. When viewed through cross polarized viewing glasses, separate views will appear for the left and right eyes of the viewer.

5 Claims, 2 Drawing Sheets

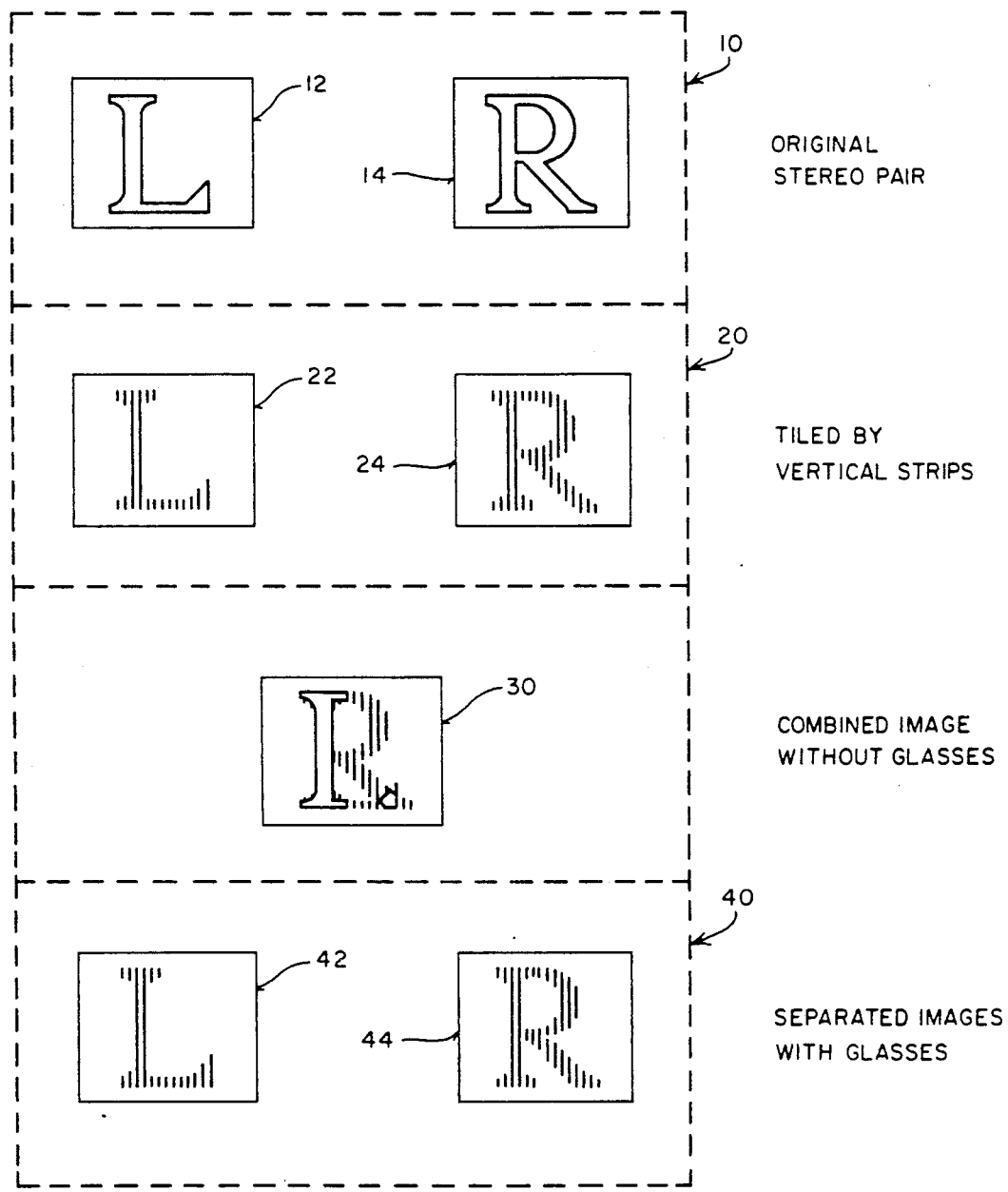

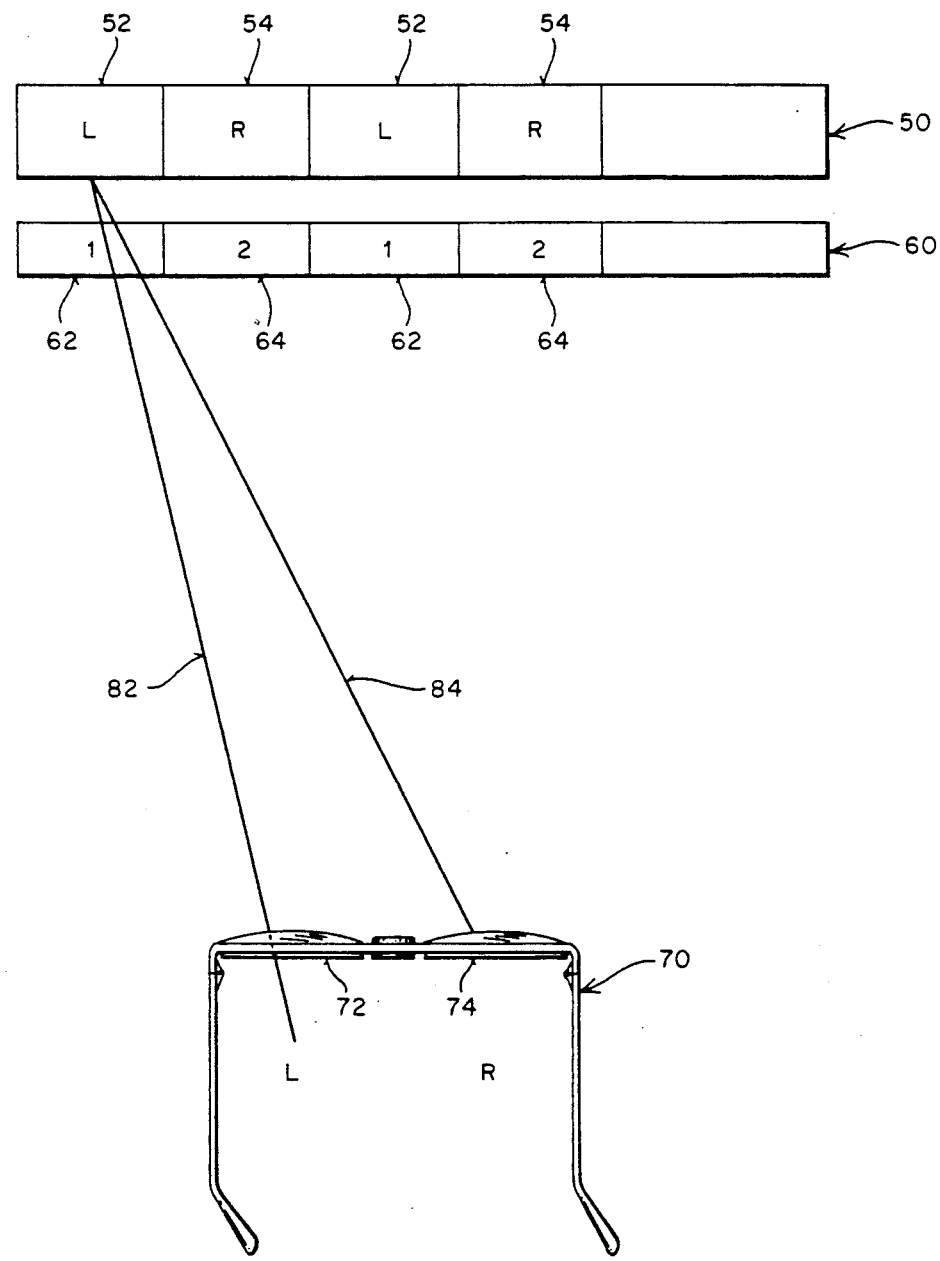

POLARIZED MASK STEREOSCOPIC DISPLAY INCLUDING TILING MASKS WITH COMPLEMENTARY TRANSPARENT REGIONS

This is a continuation-in-part of co-pending application Ser. No. 07/402,945 filed on 09/05/89 and now abandoned. BACKGROUND OF THE INVENTION This invention relates to a new type of three-dimensional display. This invention provides a new method of presenting separate two-dimensional images to the left eye and right eye of a person so that the person will perceive a single three-dimensional image.

It is known that if two separate two-dimensional images of a scene, called a "stereo pair," are presented separately to the left eye and right eye of a viewer, the viewer will perceive a combined, three-dimensional image of the scene. This "stereoscopic" technique has been performed in several ways, separating the two images by color, polarization or time-sequence.

In color separation, the viewer wears glasses with, for example, red and green lenses. Two images are displayed, each processed by color filters to appear strongly through only one of the red or green lenses. The color alteration produced by this method is unacceptable for many uses.

In polarization separation, the viewer wears glasses with cross polarized lenses. Two images are displayed, each separately transmitted by a polarized light source or through a polarizing filter to appear strongly through only one of the polarized lenses. However, two image sources of cross polarization are required, and this method cannot be applied, for instance, to a television screen or computer CRT display that has a single illumination source.

In time-sequence separation, the viewer wears glasses with alternating left and right eye shutters, synchronized with the alternating presentation of the left and right eye images. Only one eye is unshuttered at a time, and only one of the two images is presented at a time. This alternating process introduces flicker into the perceived three-dimensional image since the effective viewing rate or frame rate has been halved. The glasses are also complex and cumbersome, and require a connection to the display to synchronize their switching with the switching of the images.

In a second form of time-sequence separation, the viewer wears glasses with cross polarized lenses, and alternating left and right eye images are displayed; but a large switched polarizer sheet overlaying the display alternates between two polarizations in synchronization with the alternating images. This form of time-sequence stereoscopic separation also reduces the frame rate and introduces flicker.

This invention provides a new method of three-dimensional viewing which does not require two separate cross polarized light sources, does not require a synchronizing connection to cumbersome alternating-shutter glasses, and does not reduce the viewing frame rate. This invention is particularly well-suited to a flat panel display such as an liquid crystal display (LCD) or electro-luminescent (EL) display.

SUMMARY OF THE INVENTION

This invention provides a simple and inexpensive full-spectrum stereoscopic display system for three-dimensional viewing of images. The system uses a full-spectrum display image, a polarized mask overlaying the display image, and polarized viewing glasses. "Full-spectrum" is to be interpreted to mean that no intentional color separation or filtering is applied to separate the left-eye and right-eye images or to prevent the full color spectrum of an image of the stereo pair from reaching the viewer.

The display image is divided into small regions or tiles. Alternate tiles show image selected from the left and right images of a stereo pair. That is, a left-eye tile shows that corresponding piece from the left eye view of a stereo pair, while an adjacent right-eye tile shows its corresponding piece from the right eye view of the stereo pair. In this way, the display image is a composite, or mosaic, of the two images of the stereo pair.

A polarized mask overlaying the display image is divided into the same pattern of small regions or tiles as the display image. Alternate tiles have a polarizer in a first orientation and in a second, cross polarized, orientation. That is, all left-eye tiles are covered by a tile polarized in a first orientation, and all right-eye tiles are covered by a tile polarized in the second, cross polarization. The polarized mask is positioned so that its tiles overlay and align to the corresponding tiles of the display image.

The viewer wears a pair of polarized viewing glasses with a polarizer in the first orientation in front of the left eye, and a polarizer in the second, cross polarized, orientation in front of the right eye. Where the polarization of a lens and a region of the polarized mask match, the underlying display image can be seen. Where a lens and region of the polarized mask are cross-polarized, no image can be seen. Because of the polarized mask and polarized glasses, the left eye will see only left-eye tiles, and the right eye will see only right-eye tiles. When these separate images are a stereo pair, they can be perceived as a single three-dimensional image by the viewer.

BRIEF DESCRIPTION OF THE DRAWINGS

FIG. 1 shows the processing of a stereo pair of images in a manner useful in understanding this invention.

FIG. 2 shows an cross-sectional top view of a flat panel stereoscopic display system in accordance with this invention.

DETAILED DESCRIPTION

FIG. 1 shows the processing of a stereo pair of images in a manner useful in understanding this invention. An original stereo pair of images 10 has a left-eye image 12 and a right-eye image 14. A fine, alternating pattern and its inverse, are used to mask or divide the stereo pair 10 into a tiled pair of images 20. In FIG. 1 a pattern of vertical strips masks the left-eye image 12 into a tiled left-eye image 22. The inverse, or complementary pattern of vertical strips is used to tile the right-eye image 14 into a corresponding tiled right-eye image 24. Tiled left-eye image 22 contains image in the first and all following odd-numbered vertical strips, while the image in all even-numbered strips can be masked or discarded. Tiled right-eye image 24 contains image in the second and all following even-numbered vertical strips, while the image in all odd-numbered strips can be masked or discarded.

A combined display image 30 is formed by selecting alternating tiles from the tiled left-eye image 22 and tiled right-eye image 24. That is, a first strip of the combined display image 30 is selected from the first strip of the tiled left-eye image 22. The second strip of the combined display image 30 is selected from the second strip of the tiled right-eye image 24. This alternation continues across the combined display image 30, so that the display image 30 is a mosaic or combination of alternating strips from the two tiled images 20. The combined display image 30 is a composite of odd-numbered strips from left-eye image 22 and even-numbered strips from right-eye image 24.

A polarized mask overlying the display image 30 is tiled according to the same tiling pattern with a strip of a first polarization covering the first strip of the combined image 30, and a strip of second, crossed polarization covering the second strip of the combined image 30. The polarized mask strips continue to alternate their polarization across the combined display image 30, so that all tiles from the tiled left-eye image 22 are covered by strips of first polarization, and all tiles from the tiled right-eye image 24 are covered by strips of the second polarization.

The viewer then wears polarized glasses, with a polarizer of the first orientation in front of the left eye, and a polarizer of the second polarization in front of the right eye. The viewer will see separated images 40. There will be a separate left eye image 42 and a separate right-eye image 44. The left eye image passes through the matching first-orientation polarizers of the polarized mask and glasses to be observed as the left-eye image 42. The right-eye image passes through the matching second-orientation polarizers of the polarized mask and glasses to be observed as the right-eye image 44. Strips of the right eye image appear black to the left eye, and vice-versa. In this way, a stereo pair of images can be combined for display in a single display image 30, and then polarized to allow separation into left and right eye images for the viewer.

The stereoscopic technique of this invention can be applied in many ways such as in printing, or in projection systems. In printing, two images can be tiled and combined into a single display image on a printed page. The printed page can be overlayed with a transparent polarization sheet which has the same tiling pattern of polarized regions in first and second orientations. A viewer wearing glasses with cross polarized lenses can see separate images. In projection systems, two images can be tiled and combined into a single display image. The image can be projected through a polarized mask tiled with the same pattern, and a viewer wearing polarized glasses can see separate images. These and other applications will be apparent to one skilled in the art.

The stereoscopic technique of this invention is particularly well-suited to a flat panel display such as an liquid crystal display (LCD) or electro-luminescent (EL) display. FIG. 2 shows an cross-sectional top view of a flat panel stereoscopic display system in accordance with this invention. A flat panel display 50 of pixel elements is divided into alternating first pixel elements 52 and second pixel elements 54. A first pixel element 52 displays a first image element from a corresponding area on a left-eye image of a stereo pair. Second pixel element 54 displays a second image element from a corresponding area on a right-eye image of a stereo pair. Continuing across flat panel display 50, alternating pixel elements 52, 54 display alternating left and right image elements from a stereo pair.

A polarized mask 60 is divided into alternating first polarizer regions 62 and second polarizer regions 64. Each region is of a size and located to overlay and align to underlying pixel elements 52, 54. First polarizer regions 62 contain a polarizer of first orientation. Second polarizer regions 64 contain a polarizer of second, crossed polarization. Therefore, the image from a first pixel element 52 will pass through a first polarizer region 62 and be polarized to the first orientation. The image from a second pixel element 54 will pass through a second polarizer region 64 and be polarized to the second orientation.

The polarized mask 60 can be made in several ways. Polarization material can be cut into strips and applied in alternating orientations to a substrate or the display surface. Alternatively, the polarized mask can be formed by joining patterned sheets of polarization material, with a first sheet having the first polarizer regions 62 formed on an otherwise transparent sheet, and a second sheet having the second polarizer regions 64 formed on an otherwise transparent sheet. Alternatively, the first and second polarizer regions can be formed by patterned deposition processes, depositing regions of polarization material in first or second orientations onto a substrate or the display surface.

A viewer wears polarized glasses 70 with a first lens 72 polarized to the first orientation for the left eye, and a second lens 74 polarized to the second orientation for the right-eye. As illustrated by light ray 82, a left-eye image element from a first pixel element 52 will pass through a first polarizer region 62 and be polarized to the first orientation. This light ray 82 will pass through the first lens 72 polarized to the first orientation and can be seen by the viewer's left eye. However, as illustrated by light ray 84, a light ray polarized to the first orientation, will be in cross polarization to the second lens 74, and will not pass through to be seen by the viewer's right eye. In this way, the rays from pixel elements for the left and right eyes are polarized as they pass through the polarized mask, and are then admitted or blocked by the polarized glasses to produce separate images for the left and right eye of the viewer. It should be understood that the display need not operate by projecting light, but can be viewed by light falling upon and reflecting from the display.

It should be noted that a stereoscopic display system in accordance with this invention as above described does not require two separate cross polarized light sources. It also does not require time-synchronizing the display images to the elements of the display system, and no elements must shutter or switch. This invention does not reduce the frame rate of the display and avoids the consequent flicker. It is also a "full-spectrum" stereoscopic display system. "Full-spectrum" is to be interpreted to means that no intentional color separation or filtering is applied to separate the left-eye and right-eye images or to prevent the full color spectrum of an image of the stereo pair from reaching the viewer. These and other advantages will be apparent to one skilled in the art of stereoscopic displays.

Many tiling patterns may be used in forming the display image and in tiling the polarized mask. For a system using horizontal scan lines, it is straightforward to use horizontal scan lines as the tiling regions. Where a display is composed of individual pixels, horizontal or vertical lines of pixels can be used as the tiling regions. Small rectangular or circular regions may be preferred, depending on the characteristics of the images to be displayed, the ease of discerning tiling region boundaries, the ease of forming identical tile regions on the overlaying polarized mask, and the operational characteristics of the display apparatus. The tiling pattern can be any roughly 50%/50% division of the image plane with a small granularity. Experiments have indicated that tile strips wider than 0.125 inches degrade the perception of stereo for arms-length viewing of a 4 inch by 5 inch image.

The polarized mask should be quite close to the display surface to reduce parallax problems. In addition, the position of the mask must be in a fixed alignment to the display tiles. In some cathode ray tube (CRT) displays, the position of horizontal scan lines, and the position of pixels along the scan lines wanders with changes in power, brightness, and other factors. These problems do not arise in displays with a fixed pixel grid such as flat panel displays such as LCD or EL displays. In fact, LCD and EL displays typically already have a polarized layer formed on them to reduce reflections, this polarized layer could be replaced with a polarized mask in accordance with this invention.

It should be noted that the image rejection by cross-polarization may not be perfect and that unwanted image may leak through, causing ghosting or degradation of the stereoscopic effect. Quarter-wave plates can be placed over the image and on the front of the polarized glasses to change linear polarization into clockwise and counter-clockwise polarization, reducing crosstalk caused by tilting the head.

A display image which is not the combination of a stereo pair can be viewed with or without the polarized glasses. A display image which is the combination of a stereo pair, may appear fuzzy or unfocused without the polarized glasses, depending on the differences between corresponding image regions of the stereo pair.

These and other embodiments can be practiced without departing from the true scope and spirit of the invention, which is defined by the following claims:

What is claimed is:

1. A full-spectrum stereoscopic display system, without requiring color separation between left-eye and right-eye views, for presenting a first and second full-spectrum image of a stereo pair of images to the left and right eyes of a viewer so that the viewer can perceive a three-dimensional image, comprising:
    a display image comprising a pattern of alternating first and second regions, said first regions displaying the full-spectrum image from corresponding regions of said first full-spectrum image of said stereo pair, and said second regions displaying the full-spectrum image from corresponding regions of said second full-spectrum image of said stereo pair, said first and second regions selected through transparent regions of a tiling mask and its inverse respectively;
    a polarized mask patterned with the same said pattern of alternating first and second regions, said first regions containing a first polarizer of a first orientation, and said second regions containing a second polarizer of a second orientation, said polarized mask positioned between said display image and said viewer and positioned so that said pattern of said polarization mask appears overlayed and aligned to said pattern of said display image; and
    polarized viewing glasses, with first and second polarized filter lenses in front of said left and right eyes of said viewer, said first polarized filter lens being in said first orientation and said second polarized filter lens being in said second orientation;
    wherein, said first full-spectrum image from said first regions of said display image travels through said first regions of said polarized mask and through said first polarized filter lens of said viewing glasses to reach said left eye, while said second full-spectrum image from said second regions of said display image travels through said second regions of said polarized mask and through said second polarized filter lens of said viewing glasses to reach said right eye.

2. A stereoscopic display system as in claim 1 wherein said first and second orientations are in cross polarization.

3. A stereoscopic display system as in claim 1 wherein said mask is closely overlayed to said display image.

4. A stereoscopic display system as in claim 1 wherein said first and second regions comprise alternating first and second lines of pixels.

5. A method of full-spectrum sterocopic display, without requiring color separation between left-eye and right-eye views, wherein the steps comprise:
    tiling a display image by selecting first and second full-spectrum images for alternate tiles from corresponding image areas of first and second full-spectrum images of a stereo pair of images, said first full-spectrum image selected through transparent regions of a first tiling mask, and said second full-spectrum image selected through transparent regions of a second tiling mask inverse to said transparent regions of said first tiling mask;
    covering said display image with a polarized mask with identically tiled polarizers alternating between first and second polarizations; and
    viewing said display image through polarized glasses with polarizing lens filters of said first and second polarizations, and through said polarized mask.

* * * * *